United States Patent

Patterson

[15] 3,704,361

[45] Nov. 28, 1972

[54] BINARY SYNCHRONOUS UP/DOWN COUNTER

[72] Inventor: Albert D. Patterson, Galion, Ohio

[73] Assignee: North Electric Company, Galion, Ohio

[22] Filed: April 30, 1971

[21] Appl. No.: 138,973

[52] U.S. Cl...........235/92 CP, 235/92 R, 235/92 EU, 235/92 LG, 235/168

[51] Int. Cl...............................................H03k 21/06

[58] Field of Search...........235/92 CP, 92 LG, 92 DP

[56] References Cited

UNITED STATES PATENTS

| | | | |
|---|---|---|---|
| 2,892,587 | 6/1959 | Baker | 235/92 CP |
| 2,823,855 | 2/1958 | Nelson | 235/92 CP |

*Primary Examiner*—Maynard R. Wilbur

*Assistant Examiner*—Robert F. Gnuse

*Attorney*—Johnson, Dienner, Emrich, Verbeck & Wagner

[57] ABSTRACT

A binary counter consisting of a binary adder and flip-flops, the Q outputs of the flip-flops being connected to the A inputs of the adder, the Σ outputs of the adder being connected to the D inputs of the flip-flops. By connecting the B input of the adder to any of several combination of source voltages, the counter may be used as a down counter or an up counter wherein the sequence of steps up or down is selectively variable.

A count pulse may be provided for pulsing in the new count to the flip-flops. In addition, a set signal may be provided to load the flip-flops and a reset signal may be provided to clear the flip-flops.

21 Claims, 3 Drawing Figures

INVENTOR
ALBERT D. PATTERSON

BY Johnson Dienner Emrich Verbeck-Wagner
ATTORNEYS

BINARY SYNCHRONOUS UP/DOWN COUNTER

BACKGROUND OF THE INVENTION

1. Field of the Invention

The present invention relates to the field of pulse counters utilizing solid state circuitry.

2. Description of the Prior Art

The more conventional counters used in the field today include BCD counters, Excess 3 counters, Two Out of Five counters, Gray Code counters. The use and application of such type counters in the different fields is well known. In the telephone field, by way of brief example, electrical pulses are utilized in the control of switching operations which extend telephone communications over the exchange. In the computer art, arithmetic unit counters have been widely used to generate sequence or control pulses. Such counters were frequently implemented by multiplying a preloaded value and counting either up or down from such value. In control circuitry, counters may be preset to a given value, and a certain number of pulses (or a pulse width output) determined by such given value is obtained by operation of the counter. Counters are also frequently used to time intervals, and to divide or add clock pulses to obtain a sustained duration of time for control purposes.

In these various applications, it has been the conventional practice to design each counter specifically for the intended use. That is, if a specific application were required in the field, the engineer would draw a block diagram, create the desired circuitry, and interconnect the resulting components. Discrete component tricks would be used in an attempt to reduce the number of components and thereby reduce the cost of the counter. Then, out of the discrete components selected, the resulting design, consisting of flip-flops and gates, would be built up on a card.

The gates and flip-flops would normally be implemented specifically for (a) the type of counter desired, BCD counter, Excess 3 counter, Two Out of Five counter, Gray Code counter, whether binary, synchronous binary, or asynchronous binary, and (b) the particular counting sequence desired. The use of gates in the prior art, through reducing the cost of the counter, made the circuitry more complex. This had the added disadvantage of making the counter harder to learn, especially for maintenance and service personnel. In addition, the application or use of such counters was, in most instances, restricted to the particular use for which the counter was designed. There is a need in the field therefore for a general purpose counter which has more flexibility in application, which is economically practical, and which is less complex from a servicing standpoint.

SUMMARY OF THE INVENTION

The basic counter of the present invention comprises an adder and four flip-flops which may be contained in three integrated circuit packages. The first package contains the adder and the second and third package each contain two D-type flip-flops or a total of four flip-flops for the system. External gating, tied to control leads, may or may not be required depending upon the particular implementation and the way the counter works with other circuitry.

There are only nine basic inputs to the adder. Five of these inputs, one of which is a CARRY IN input, are tied to external signals. The remaining four of these inputs, the A inputs (or bit inputs), are tied to the Q outputs of the four flip-flops. Four of the adder output leads, the sum (Σ) outputs, are connected back to the D inputs of the four flip-flops. The adder also has a CARRY OUT output. Each flip-flop in addition has a clock pulse input, and, according to the particular application, set and reset inputs.

The present approach encompasses a simpler method of changing the counting operation of the counter than was possible in the prior art. Whereas, in the prior art, the logic circuitry had to be changed in order to change the type of counting that was done, in the present embodiment it is only necessary to change the inputs to one or more of the four B input terminals (or control input terminal). These B input terminals facilitate changing the counter from a general purpose binary counter to one having a specific embodiment. Depending upon the combination of counting to be implemented, various B input terminals are connected to various source potentials.

By changing the signal input to the CARRY IN terminal, further changes in the type of counter are possible. In addition, the CARRY OUT terminal may be connected to various types of circuits to accomplish different purposes.

In one embodiment of the novel counter disclosed herein, the output of an oscillator is gated into the clock lead C terminal inputs of the flip-flops. In such embodiment, the counter is not a free-running counter but a start-stop counter and uses a reset pulse as a general clear for the flip-flop and a set pulse to preset the flip-flops to a desired binary value. When the desired binary value is loaded into the flip-flops, a carry out pulse appears at the output of the adder to remove the inhibit on the clock pulse gates and to allow the clock pulse to pulse the flip-flops. In this manner, the counter cyclically enables itself until a carry-out pulse no longer appears at the CARRY OUT terminal.

In a further modification, the basic circuitry may be implemented as a simple free-running counter by feeding the clock pulses from a free running oscillator into the clock lead input of the flip-flops.

If a counter larger than a four-bit counter is desired (as for example, an eight bit counter) a second four-bit adder and flip-flops can be added to the original counter. The CARRY OUT terminal of the original four bit adder is connected to the CARRY IN terminal of the second four bit adder, and the flip-flops are connected to their associated adders in the manner described above. All eight of the B terminals may be connected to the same logic signal and the CARRY IN terminal may be connected to the opposite logic signal. If a third adder and flip-flops were added in a like pattern, a 12 bit counter will be provided. A fourth adder and associated flip-flop are applied to provide a 16 bit counter, etc.

While four flip-flops are used with each adder in the illustrated embodiment, it is possible to omit the connection of one or more terminals of the adder to associated flip-flops which flip-flops accordingly remain idle in the counting operation. Thus, if only a ten bit counter is desired, the last two flip-flops and the last two A terminal inputs and Σ terminal outputs of the third adder of a twelve bit counter would not be connected for use. If all the A terminals are not used, the terminals not used should be connected to ground for down counting or to +5 for up counting.

It will be apparent that the counter of the present invention provides a hardware unit which has the flexibility of a programmed machine. In addition, the counter is simpler and easier to understand, less expensive to build, smaller, lighter in weight, and is more reliable than those counters found in the prior art, the provision of which is an object of the present invention.

DESCRIPTION OF THE PREFERRED EMBODIMENT

Figure 1:
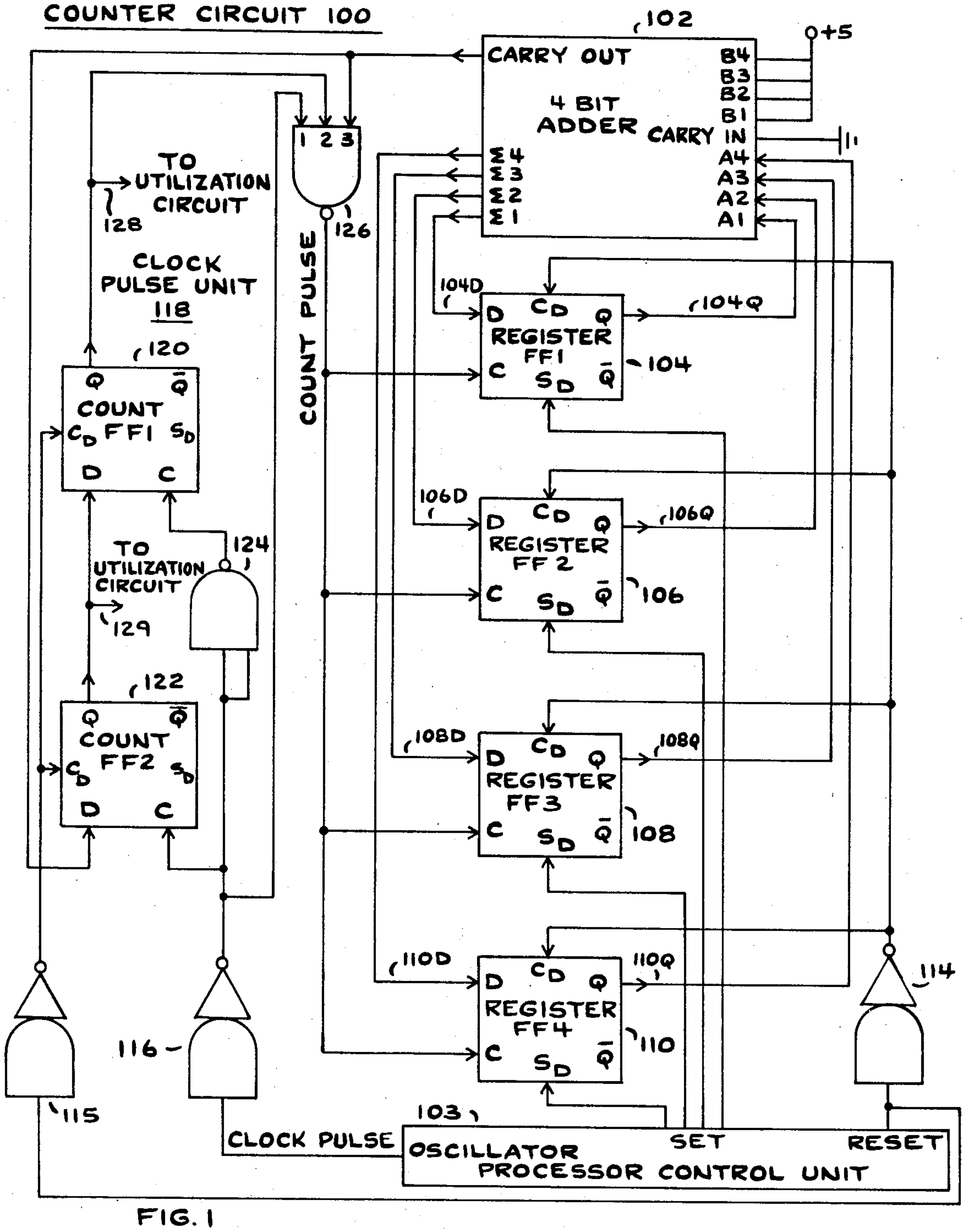
FIG. 1 shows a novel stop start counter which incorporates the basic invention of the disclosure.

With reference to FIG. 1, the counter 100 basically consists of four-bit adder integrated circuit 102 and four integrated circuit flip-flops 104, 106, 108 and 110. The four-bit adder 102 has nine input terminals labeled $A_1$, $A_2$, $A_3$, $A_4$, $B_1$, $B_2$, $B_3$, $B_4$ and CARRY IN. The four bit adder 102 is shown having five outputs $\Sigma_1$, $\Sigma_2$, $\Sigma_3$, $\Sigma_4$, and CARRY OUT.

Each of the four register flip-flops 104, 106, 108, and 110 has four inputs labeled $S_D$, C, D, $C_D$, and an output Q. An additional output of the flip-flop labeled $\overline{Q}$ is not used in the present embodiment. The Q output of the first register flip-flop 104 is tied to the first input $A_1$ of the adder 102; and the Q output of the second register flip-flop 106 is tied to the second input $A_2$ of the adder 102, the Q output of the third register flip-flop 108 is tied to the third input $A_3$ of the adder 102; and the Q output of the fourth register flip-flop 110 is tied to the fourth input $A_4$ of the adder 102.

The output of the four-bit adder 102 consists of a first terminal $\Sigma_1$ tied to the D input of the first register flip-flop 104; a second terminal $\Sigma_2$ tied to the D input of the second register flip-flop 106; a third terminal $\Sigma_3$ tied to the D input of the third register flip-flop 108; a fourth terminal $\Sigma_4$ tied to the D input of the fourth register flip-flop 110.

The counter 100 of the present invention will be found in copending application, Ser. No. 139,014 filed on even date herewith by Cheney, et al. In said copending application, the counter will be found in FIGS. 37 and 38 of the shift control 421 of data handling unit 110 which cooperates with processor control unit (PCU) 103. As shown in FIG. 1, the features of the PCU 103 associated with the counter 100 are the oscillator subsystem, the set subsystem and the reset subsystem. It will be understood, however, that cooperation with a processor control unit is not the only way a counter 100 can be implemented. For example, each of the separate subsystems of the PCU 103 may instead be individual circuits operated manually if so desired The output conductor of the reset subsystem of the processor control unit 103 provides reset pulses over gate 114 to each of the $C_D$ inputs of the four register flip-flops 104, 106, 108, and 110; and through gate 115 to the $C_D$ inputs of the two count flip-flops 120, 122 of the clock pulse circuit 118. The pulse output over such path clears each of the flip-flops, setting the flip-flops to zero.

In one variation of the system shown in FIG. 1, the reset pulses may be connected into selective ones of the flip-flops to vary the count registered thereon.

Further output conductors of the processor control unit 103 are connected to the $S_D$ terminals of the four register flip-flops 104, 106, 108, and 110 individually as shown. The set signal on such conductors is used to load a predetermined desired count into the four register flip-flops in known manner.

In the start-stop counter embodiment shown in FIG. 1, another output conductor of the processor control unit 103 provides clock pulses from an associated oscillator circuit over gate 116 to clock pulse circuit 118 which includes a pair of count flip-flops 120 and 122. Count flip-flops 120 and 122 each have associated input terminals D and C and output terminal Q connected to the counter circuitry. Terminals $S_D$ and $\overline{Q}$ of flip-flops 120 and 122 are not utilized in the present embodiment.

As shown in FIG. 1, the clock pulses from the oscillator in control unit 103 are fed (a) over gate 116 to input terminal C of flip-flop 122, (b) over gate 116 and 124 to the input terminal C of count flip-flop 120, and (c) over gate 116 to a first input terminal of gate 126.

The output which appears at the Q terminal of flip-flop 122 is connected to the D input of flip-flop 120 and the output from terminal Q of count flip-flop 120 is fed to a second terminal of gate 126. The CARRY OUT output of the four-bit adder 102 is connected to the third terminal of gate 126 and also to the D input of count flip-flop 122. The output of gate 126 is connected to the C input terminal of each of the four register flip-flops 104, 106, 108, and 110.

In the counter embodiment of FIG. 1, the adder 102 has each of its B terminals connected to a +5 voltage source and the CARRY IN input connected to ground potential, whereby the adder will decrease its output by one count for each count input thereto over inputs A1, A2, A3, A4.

In operation, a reset pulse is first fed over gate 114 to each of the register flip-flops 104, 106, 108, and 110 and over gate 115 to each of the clock flip-flops 120, 122, to set each flip-flop to reset condition. The processor control unit next provides a count to the register flip-flops 104, 106, 108, and 110 by selectively marking the conductors which are connected to terminals SD with the binary count to be set into the counter. With such input, the binary value of the number loaded into the four flip-flops then appears on the Q outputs of these four register flip-flops to the A1–A4 input terminals of the four-bit adder 102. The binary value which appears at input terminals A1–A4 is added to the binary value which appears on the B input terminals plus the value which appears on the CARRY IN input terminal. The four-bit adder 102 accumulates a new total determined by the value on these nine inputs, and the resultant total appears as a binary number at the four Σ terminals and at the CARRY OUT output terminal of adder 102. If the pulse appearing at the CARRY OUT terminal is a logic 1, such pulse at the third terminal of gate 126 and on the D input terminal of flip-flop 122 will effect further clocking of the counter circuit.

More specifically, with a logic 1 output from the CARRY OUT of the four-bit adder 102 on input terminal D of flip-flop 122, when a first clock pulse is output by the oscillator to the input terminal C of count flip-flop 122, count flip-flop 122 will produce an output pulse at terminal Q which is reflected at the input terminal D of count flip-flop 120.

With a pulse from count flip-flop 122 at the input terminal D of flip-flop 120 when a second oscillator pulse is gated over gates 116 and 124 to input C, an output will appear at the Q terminal of count flip-flop 120 and thereby at the second input terminal of gate 126. With enabling signals on inputs 2 and 3, with the occurrence of a third oscillator pulse, a pulse appears on input of gate 126.

With such signals appearing on all three terminals of gate 126, an output pulse from gate 126 will be pulsed into the C input terminals of the four register flip-flops 104, 106, 108, and 110. As a result, the four flip-flops register the accumulated total which is marked on the D input terminals as reflected from the Σ outputs of the four-bit adder 102. The new number input to the flip-flops is immediately reflected on the Q outputs of the four register flip-flops, which in turn is reflected on the A1–A4 inputs of the four-bit adder 102. The new input binary value input to the A1–A4 terminals are then added to the binary value marked on the B input terminals and the CARRY IN terminal. The resultant total, as accumulated by the four-bit adder 102, will again appear on the Σ1– Σ4 output terminals and on the CARRY OUT output terminal. The new value appearing at the Σ output terminals of the four-bit adder 102 is applied to the D input terminals of the four register flip-flops 104, 106, 108, and 110.

As a further clock pulse from gate 126 enters the C terminals of the four register flip-flops, the new value appearing at the D input terminals will be registered in the four register flip-flops 104, 106, 108, and 110 and will appear at the associated Q output terminals, and at the associated A input terminals of the four-bit adder 102. The adder, as before, accumulates the value appearing at the B input terminals and the CARRY IN terminal and provides the new total at the output terminals.

During this process, outputs can be tapped off various parts of the counter to affect various utilization circuits. Such taps can be off the Q outputs of the various flip-flops of the counter. If such an output to a utilization circuit were made off count flip-flop 120 or 122, as for example tap 128 or 129, the pulsed output would be dependent upon the length of the pulse emanating from the CARRY OUT terminal of adder 102, i.e., depending upon the length of the down count. If such an output to a utilization circuit were made off a flip-flop such as 104, 106, 108, 110, the output pulse would be dependent on the initial count loaded into the register flip-flops and the particular flip-flop off which the tap is made. For example, if the tap is made to a utilization circuit from the Q output of 104 with a count of 15 initially set into the counter, eight pulses would go to the utilization circuit; off 106, four pulses twice as long; off 108, two pulses four times as long; off 110, one long pulse eight times as long; whereby a binary out could be provided to external utilization circuits identical to that provided to the adder A1–A4 terminals.

This process continues as succeeding clock pulses are received, the four-bit adder counting down (in the present embodiment) until a pulse no longer appears on the CARRY OUT output terminal. At that point, with the absence of a pulse at the third input terminal of gate 126 and at the input terminal D of count flip-flop 122, the clock pulses output from gate 126 will be terminated, and the C input terminals of the four register flip-flops 104, 106, 108, and 110 will not be clocked. The final count appearing at the Σ terminals will therefore not be clocked in at the D terminals of the four register flip-flops 104, 106, 108, 110, and the output at the Q output terminals of these register flip-flops will remain the same. With the Q output of the flip-flops unchanged, the A input terminals of four-bit adder 102 will likewise be unchanged, and the output at the Σ output terminals remains the same. The counting process will have now been terminated.

The fact that the pulse no longer appears at the Q output terminal of count flip-flop 120 can be detected by a utilization circuit tapped off at 128. In this manner, the utilization circuit will be apprised that the end of the count has been reached and appropriate action as programmed can be taken.

In order to restart the counter again, the flip-flops 104, 106, 108, 110 are reset through the $C_D$ inputs and the new count is loaded into the four register flip-flops over the $S_D$ inputs. The new input count appears at the four register flip-flop Q output terminals and at the A input terminals of adder 102. The new input to adder 102 is added to the value appearing at the B input terminals and the CARRY IN terminal, and appears at the Σ output terminals and at the CARRY OUT output terminal.

As before, the pulse appearing at the CARRY OUT output terminal will cause the new count appearing at Σ output terminals of adder 102 to be clocked into he flip-flops 104, 106, 108, 110 and the counting process will continue until no pulse appears at the CARRY OUT output terminal of the adder 102 at which time the counting process will again stop.

An example of the counter operation described above is set forth in Table 1 below.

TABLE I

| State | $Q_4$ $A_4$ | $Q_3$ $A_3$ | $Q_2$ $A_2$ | $Q_1$ $A_1$ | + | $B_4$ | $B_3$ | $B_2$ | $B_1$ | + | $C_{IN}$ | = | $C_{OUT}$ | $\Sigma_4$ $D_4$ | $\Sigma_3$ $D_3$ | $\Sigma_2$ $D_2$ | $\Sigma_1$ $D_1$ | Total | Value |
|---|---|---|---|---|---|---|---|---|---|---|---|---|---|---|---|---|---|---|---|
| Idle | 0 | 0 | 0 | 0 | + | 1 | 1 | 1 | 1 | + | 0 | = | 0 | 1 | 1 | 1 | 1 | 15 | 15 |
| Load | 1 | 1 | 1 | 1 | + | 1 | 1 | 1 | 1 | + | 0 | = | 1 | 1 | 1 | 1 | 0 | 30 | 14 |
| 1st count | 1 | 1 | 1 | 0 | + | 1 | 1 | 1 | 1 | + | 0 | = | 1 | 1 | 1 | 0 | 1 | 29 | 13 |
| 2nd count | 1 | 1 | 0 | 1 | + | 1 | 1 | 1 | 1 | + | 0 | = | 1 | 1 | 1 | 0 | 0 | 28 | 12 |
| 3rd count | 1 | 1 | 0 | 0 | + | 1 | 1 | 1 | 1 | + | 0 | = | 1 | 1 | 0 | 1 | 1 | 27 | 11 |
| 4th count | 1 | 0 | 1 | 1 | + | 1 | 1 | 1 | 1 | + | 0 | = | 1 | 1 | 0 | 1 | 0 | 26 | 10 |
| 5th count | 1 | 0 | 1 | 0 | + | 1 | 1 | 1 | 1 | + | 0 | = | 1 | 1 | 0 | 0 | 1 | 25 | 9 |
| 6th count | 1 | 0 | 0 | 1 | + | 1 | 1 | 1 | 1 | + | 0 | = | 1 | 1 | 0 | 0 | 0 | 24 | 8 |
| 7th count | 1 | 0 | 0 | 0 | + | 1 | 1 | 1 | 1 | + | 0 | = | 1 | 0 | 1 | 1 | 1 | 23 | 7 |
| 8th count | 0 | 1 | 1 | 1 | + | 1 | 1 | 1 | 1 | + | 0 | = | 1 | 0 | 1 | 1 | 0 | 22 | 6 |

TABLE I – Continued

| State | $Q_4$ $A_4$ | $Q_3$ $A_3$ | $Q_2$ $A_2$ | $Q_1$ $A_1$ | + | $B_4$ | $B_3$ | $B_2$ | $B_1$ | + | $C_{IN}$ | = | $C_{OUT}$ | $\Sigma_4$ $D_4$ | $\Sigma_3$ $D_3$ | $\Sigma_2$ $D_2$ | $\Sigma_1$ $D_1$ | Total | Value |
|---|---|---|---|---|---|---|---|---|---|---|---|---|---|---|---|---|---|---|---|
| 9th count | 0 | 1 | 1 | 0 | + | 1 | 1 | 1 | 1 | + | 0 | = | 1 | 0 | 1 | 0 | 1 | 21 | 5 |
| 10th count | 0 | 1 | 0 | 1 | + | 1 | 1 | 1 | 1 | + | 0 | = | 1 | 0 | 1 | 0 | 0 | 20 | 2 |
| 11th count | 0 | 1 | 0 | 0 | + | 1 | 1 | 1 | 1 | + | 0 | = | 1 | 0 | 0 | 1 | 1 | 19 | 1 |
| 12th count | 0 | 0 | 1 | 1 | + | 1 | 1 | 1 | 1 | + | 0 | = | 1 | 0 | 0 | 1 | 0 | 18 | 4 |
| 13th count | 0 | 0 | 1 | 0 | + | 1 | 1 | 1 | 1 | + | 0 | = | 1 | 0 | 0 | 0 | 1 | 17 | 3 |
| 14th count | 0 | 0 | 0 | 1 | + | 1 | 1 | 1 | 1 | + | 0 | = | 1 | 0 | 0 | 0 | 0 | 16 | 0 |
| 15th count | 0 | 0 | 0 | 0 | + | 1 | 1 | 1 | 1 | + | 0 | = | 0 | 1 | 1 | 1 | 1 | 15 | 15 |

TABLE 1

Assuming initially that the counter 100 is in its idle reset state, the following conditions prevail: the Q outputs of the four register flip-flops 104, 106, 108, 110 present an output of zero (0000) to the A inputs of the adder 102; each of the B terminals in the present embodiment are connected to logic 1 giving a B input of 15 (1111); the CARRY IN ($C_{IN}$) terminal is connected to ground (logic 0) presenting a zero input; the total accumulation of $A + B + C_{IN}$ $(0 + 15 + 0)$ is shown as an output of 15 which is represented at the CARRY OUT ($C_{OUT}$) and sum ($\Sigma$) terminals by 01111.

In the present example, it is assumed that the set subsystem of the processor control unit 112 loads a value 15 (1111) by marking the four conductors SD to the four register flip-flops 104, 106, 108, 110 with logic 1 (i.e., 1,1,1,1 respectively). The four Q output terminals of the four register flip-flops present this value to the A1–A4 input terminals of the adder 102. The adder adds this value 15 (1111) which appears at the A terminals to the value 15 (1111) which appears at the B terminals and the value zero which appears at the $C_{IN}$ terminal.

The total accumulation 30 (11110) is reflected at the five output terminals $C_{OUT}$, $\Sigma_4$, $\Sigma_3$, $\Sigma_2$, $\Sigma_1$. However only the $\Sigma_4$, $\Sigma_3$, $\Sigma_2$, $\Sigma_1$ terminals are connected to the D inputs of the register flip-flops 104, 106, 108, 110 and a value of 14 (1110) is presented to these input terminals.

The logic 1 pulse which occurs at the $C_{OUT}$ terminal is reflected on input terminal 3 of gate 126 and input terminal D of count flip-flops 122. As a clock pulse is input to the input terminal C of count flip-flop 122 and input terminal 1 of gate 126, as described above, a first count pulse will be presented to the C input terminals of the four register flip-flops and the value 14 (1110) appearing on the D input terminals will be clocked into the register flip-flops. The same value 1110 appears on he Q output terminals of these register flip-flops and on the A input terminals of the adder. Adder 102 thereupon adds the value 14 (1110) to the value 15 (1111) appearing on the B terminals ($C_{IN}$ being zero) and the total accumulation 29 (11101) will be reflected on the output terminals as a logic 1 pulse on the $C_{OUT}$ terminal and a value of 13 (1101) on the four $\Sigma$ output terminals respectively.

With the occurrence of the next clock pulse, the value 13 (1101) will be clocked into the register flip-flops. The counter will continue decreasing the value of the count until the 14th count at which time a value of 1 (0001) will appear on the Q output terminals of the register flip-flops and on the A input terminals of the adder.

The accumulation of values on the input A and B terminals (1 + 15) of adder 102 will appear on the output terminals of adder 102 as the logic 1 signal on $C_{OUT}$ terminal and as the logic 0 signal on the $\Sigma$ terminals. This zero value will be clocked via the D input terminals into the register flip-flops on the 15th count, and will be reflected on the Q output terminals of the flip-flops and on the A input terminals of the adder. The adder will accumulate this zero value with the value 15 (1111) on the B input terminals and the total will be reflected on the adder output terminals as 15 (01111). The value 15 (1111) will appear on the $\Sigma$ terminals, but no logic 1 pulse will appear on the $C_{OUT}$ terminal. With no pulse input to terminal 3 of gate 126 and terminal D of count flip-flop 122, as the next clock pulse is received, the value 15 will not be input into the register flip-flops, the value of zero will remain in the register flip-flops, the counter 100 will stop its count, and this fact will be detected by a utilization circuit, via lead 128 and/or 129.

The counter having stopped on the 15th count will be in the idle state and will remain in this idle state until a new value is loaded into the register flip-flops from the set subsystem of processor control unit 103.

As a precautionary measure, before loading the register flip-flops from the set subsystem, the reset subsystem may provide a pulse over inputs $C_D$ of the register flip-flops and the count flip-flops to insure all flip-flops are in a reset state. The set system can then load in the next desired value into the register flip-flops.

In the above example, counter 100 counted down one number at a time by reason of the fact that all the B input terminals of adder 102 are tied to a logic 1 source potential, (+5), and the CARRY IN terminal is tied to a logic 0 source potential (ground). Other types of counters (as for example wherein the countdown is by a value of 2 for each count step) can be constructed by tying the various input terminals to different source potentials.

VARIABLE COUNT CHANGE

Figure 2:
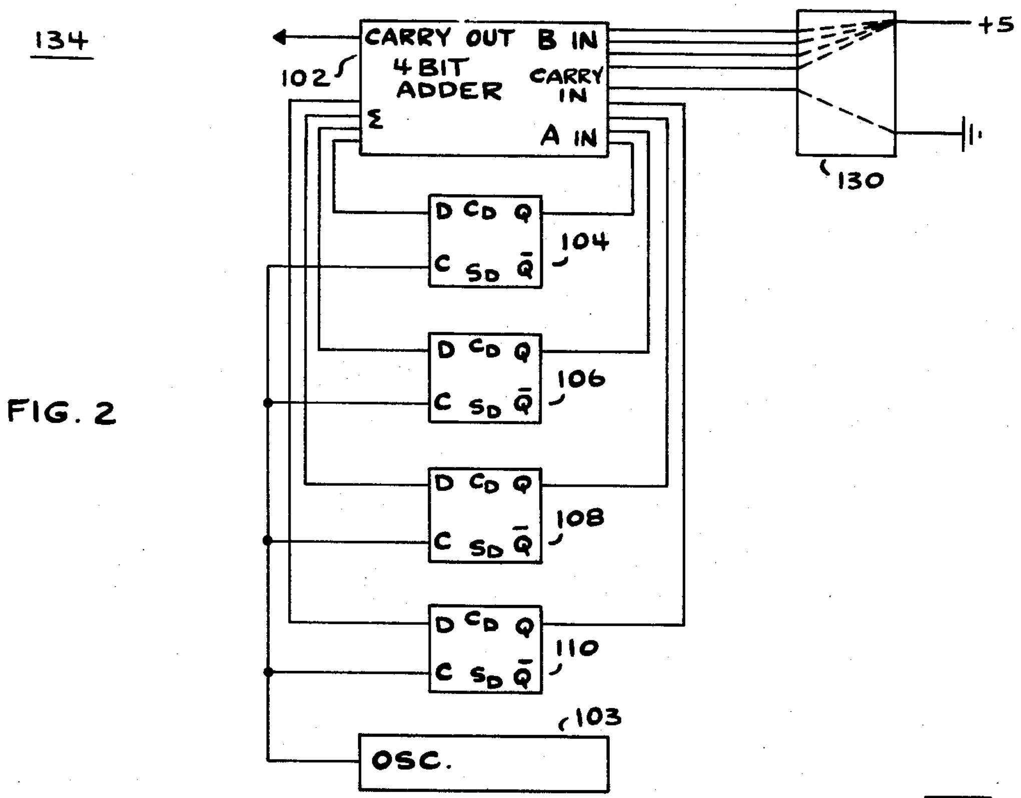
FIG. 2 shows a free running counter which embodies the basic invention, and which includes adjustable means for varying the operation of the counter circuit.

FIG. 2 shows a patch panel 130 which permits selective connection of different potentials to the four B input terminals and CARRY IN terminal. In such example, patch panel 130 permits connections of each of the B terminals and CARRY IN terminals to either +5V (logic 1) or to ground (logic 0). While shown as a patch board installation, it is apparent that switches may be provided to facilitate changing of the connections to such terminals, and thereby provide an expeditious mode for altering the type of counter and the value of the count change which occurs with each operation of the counter. For illustrative purposes, the panel of FIG. 2 is shown programmed for the type of counter shown in FIG. 1.

COUNT DECREASE

Table 2 illustrates the results of selectively connecting the B input terminals to two alternative potentials (See Column 2 for binary representation and Column 3 flops associated with an $n$-bit adder.

Except as described above, all other connections between the adders and their associated register flip-flops remain the same as described for FIGS. 1 and 2. The individual stages of counter 138 are connected together by successively tying the CARRY OUT terminal of each stage to the CARRY IN terminal of the next succeeding stage starting with the CARRY OUT terminal of adder 102 of stage 1 and ending with the final connection to the CARRY IN terminal of adder 144 of stage $m$.

Figure 3:
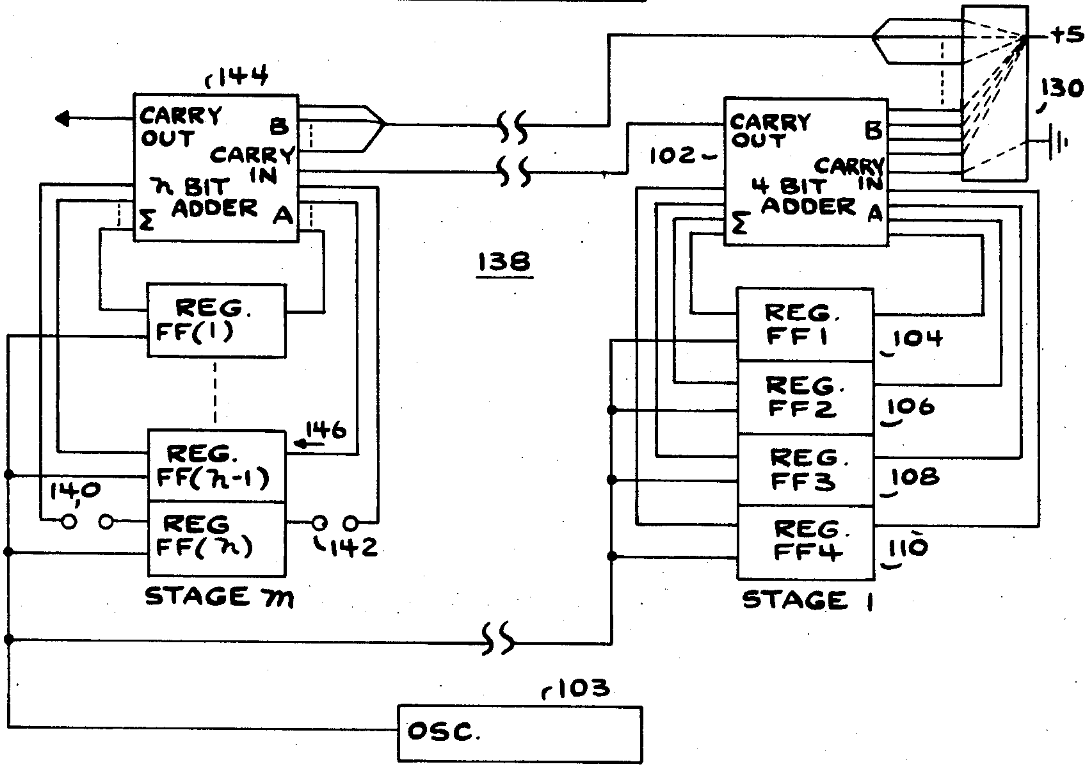
FIG. 3 shows a further embodiment of the counter of the present invention in which an "m" number of individual counters may be provided to obtain a multiple stage counter.

In the embodiment shown in FIG. 3, if no additional stages were inserted between stage 1 and stage $m$, and if the $n$ bit adder of stage m were actually a four-bit adder wherein the fourth register flip-flop was disconnected, then the resulting counter 138 would be a seven-bit counter. By similar connections counter 138 could be an eight-bit counter, a 10-bit counter, a 12-bit counter, or any number bit counter.

All the B input terminals of the multiple stage counter 138 illustrated in FIG. 3 are shown connected to the +5 terminal. With this type of connection, the counter 138 will operate as a down counter similar to the operation of counter 100 in FIG. 1 a-d counter 134 in FIG. 2; the extent of count being dependent on the number of stages comprising the counter. A logic 1 signal emanating from the CARRY OUT terminal of each preceding stage prevents the stepping of the succeeding stage. A logic 0 signal emanating from the CARRY OUT terminal at the completion of each stepping cycle allows the next clock pulse to effect a single stepping of the next succeeding stage. This manner of operation will provide a count larger than that of a single stage.

With reference to the counters illustrated in both FIGS. 2 and 3 the pulses generated therein can be fed to utilization circuitry by tapping off the register flip-flop Q output terminals or off the CARRY OUT terminals depending upon the signals desired.

MODIFICATIONS

The counter of FIG. 1 and Table 1 illustrate a counter embodiment in which digit one is subtracted from the value loaded into the register flip-flops and from each succeeding value clocked into these same flip-flops. In Table 2 it was shown that the value subtracted need not be one, but could be any number between 0 and 15. Such change in operation was achieved by merely selectively strapping the B input terminals of the adder to appropriate input potentials.

In a further variation, the novel counter may be connected to automatically jump to a previous count (i.e., rather than to count in sequence as in the foregoing rather Basically, the counter is controlled to jump at any specific count by decoding the count on the Q output terminals of the flip-flops 104, 106, 108, 110 and using this output signal to control the B input terminals to jump to the next desired $n$ number.

For this purpose a patch panel, similar to panel 130 described above, may be used to dub in the particular added value required to jump forward or backward as a succeeding clock pulse is received. That is, as a decoder circuit detects a specific number in the register flip-flop, a corresponding instruction is provided to adjust the patch panel output and thereby adjust the adder to the next desired count.

By patching in different instructions, different routines are obtained. The patch panel can be made out of diode straps or plug boards. The use of plug boards makes the counter extremely flexible since the ability of change the order of performance is available without the need of rewiring the unit. Of course, diodes can be used with plug boards. That is, the wiring is simply located on the plug board, and by merely changing the connections on the plug board itself the new order of performance would be implemented.

Control of the four B input terminals and the CARRY IN terminal in this manner provides the ability to make many other specific kinds of counters and counters of increased flexibility.

The counter may also be connected to obtain a frequency pulse rate which is lower than the pulse rate of the controlling oscillator. By utilizing a free-running counter as shown in FIG. 2 or 3, the desired lower frequency pulse rate would be obtained by deriving a signal from the desired register flip-flop in known manner.

By tapping the CARRY OUT terminal of any stage, a single logic 0 pulse can be obtained at the completion of every counting cycle of that stage. For example, suppose the multiple stage counter 138 of FIG. 3 were composed of two stages, each stage consisting of an individual four-bit counter. The signal emanating from the CARRY OUT terminal of the last stage would consist of a logic 1 signal being held for 255 counts and a logic 0 signal appearing for one count. This would be indicative of the end of a counting cycle for that stage and for the multiple stage counter 138, indicating a down-count of 256.

The counter can be synchronized with the clock of another system by providing from that system clear and set pulses to the $C_D$ and $S_D$ inputs respectively of the register flip-flops of the counter. The particular combination of flip-flops cleared and flip-flops preset is determined by the counter application.

The counter of the present invention can be either a free-running or a start-stop counter. The particular mode of operation depends solely on the manner in which the clock input to the register flip-flops is controlled.

It is possible to use different kinds of flip-flops, such as the RS flip-flop or the JK flip-flop, but in such event it will be necessary to add inverters to the system. The simplest type of flip-flop to use in the present device is the D flip-flop since the cost of the D flip-flop is competitive with the RS and JF flip-flops and tends to decrease ambiguity of the counter.

I claim:

1. In a counter circuit, at least one four bit adder circuit having a plurality of control input terminals, four bit input terminals, a carry-in input terminal, for sum ($\Sigma$) output terminals and at least one carry-out terminal, four flip-flop circuits, each of which flip-flop circuits includes at least one input terminal and at least one output terminal, first means connecting the output terminal of each of said four flip-flop circuits to a correspondingly different one of said four bit input terminals on said adder circuit to provide the count on said output terminals of said flip-flop circuits to the four bit input terminals of said adder circuit, second means connecting the input terminal of each of said four flip-flop circuits to a correspondingly different one for decimal representation); with the $C_{IN}$ terminal connected to ground which is logic 0 (see Column 2); and with the A input terminals connected to a constant input, 1111 for example (see Column 1). Column 4 indicates the resulting down count or subtraction per step. Column 5 (binary notation) and Column 6 (decimal notation) illustrate the resulting condition of the output Σ terminals and register flip-flop D input terminals after the first resulting down count step has been taken. The example of Table 1 is starred with an asterisk (*) in Table 2.

TABLE 2

| Col. 1 | | | | Col. 2 (binary) | | | | | Col. 3 (decimal) | Col. 4 | | Col. 5 (binary) | | | | Col. 4 (decimal) |
|---|---|---|---|---|---|---|---|---|---|---|---|---|---|---|---|---|
| $A_4$ | $A_3$ | $A_2$ | $A_1$ | $B_4$ | $B_3$ | $B_2$ | $B_1$ | $C_{IN}$ | value | subtract | $C_{OUT}$ | $\Sigma_4$ | $\Sigma_3$ | $\Sigma_2$ | $\Sigma_1$ | value |
| 1 | 1 | 1 | 1 | 0 | 0 | 0 | 0 | 0 | 0 | 0 | 0 | 1 | 1 | 1 | 1 | 15 |
| 1 | 1 | 1 | 1 | 1 | 1 | 1 | 1 | 0 | 15 | 1 | 1 | 1 | 1 | 1 | 0 | 14 |
| 1 | 1 | 1 | 1 | 1 | 1 | 1 | 0 | 0 | 14 | 2 | 1 | 1 | 1 | 0 | 1 | 13 |
| 1 | 1 | 1 | 1 | 1 | 1 | 0 | 1 | 0 | 13 | 3 | 1 | 1 | 1 | 0 | 0 | 12 |
| 1 | 1 | 1 | 1 | 1 | 1 | 0 | 0 | 0 | 12 | 4 | 1 | 1 | 0 | 1 | 1 | 11 |
| 1 | 1 | 1 | 1 | 1 | 0 | 1 | 1 | 0 | 11 | 5 | 1 | 1 | 0 | 1 | 0 | 10 |
| 1 | 1 | 1 | 1 | 1 | 0 | 1 | 0 | 0 | 10 | 6 | 1 | 1 | 0 | 0 | 1 | 9 |
| 1 | 1 | 1 | 1 | 1 | 0 | 0 | 1 | 0 | 9 | 7 | 1 | 1 | 0 | 0 | 0 | 8 |
| 1 | 1 | 1 | 1 | 1 | 0 | 0 | 0 | 0 | 8 | 8 | 1 | 0 | 1 | 1 | 1 | 7 |
| 1 | 1 | 1 | 1 | 0 | 1 | 1 | 1 | 0 | 7 | 9 | 1 | 0 | 1 | 1 | 0 | 6 |
| 1 | 1 | 1 | 1 | 0 | 1 | 1 | 0 | 0 | 6 | 10 | 1 | 0 | 1 | 0 | 1 | 5 |
| 1 | 1 | 1 | 1 | 0 | 1 | 0 | 1 | 0 | 5 | 11 | 1 | 0 | 1 | 0 | 0 | 4 |
| 1 | 1 | 1 | 1 | 0 | 1 | 0 | 0 | 0 | 4 | 12 | 1 | 0 | 0 | 1 | 1 | 3 |
| 1 | 1 | 1 | 1 | 0 | 0 | 1 | 1 | 0 | 3 | 13 | 1 | 0 | 0 | 1 | 0 | 2 |
| 1 | 1 | 1 | 1 | 0 | 0 | 1 | 0 | 0 | 2 | 14 | 1 | 0 | 0 | 0 | 1 | 1 |
| 1 | 1 | 1 | 1 | 0 | 0 | 0 | 1 | 0 | 1 | 15 | 1 | 0 | 0 | 0 | 0 | 0 |

COUNT INCREASE

The novel counter may also be connected to increase the count by one (or by other selected numbers) with each clocking of the register flip-flips of the counter. To add a sum to the input value which appears at the A1–A4 inputs of adder 102, the other input terminals B1–B4 and CARRY IN terminal of the adder 102 must be tied to the appropriate source potentials. It must be remembered that the CARRY IN terminal adds a one to the other input values, so that the resulting output of the adder is the sum of the inputs at $A+B+C_{IN}$. For example, to add one to any value on the A input terminals, the B1 input terminal may be tied to +5 and B2, B3, and B4 input terminals to ground, indicated logically as (0001) and the CARRY IN terminal tied to ground, indicated logically as (0), or the B input terminals may all be tied to ground, indicated logically as (0000) and the CARRY IN terminal tied to +5, indicated logically as (1). To add two (2) to any value on the A input terminals, the B input terminals may be connected logically as 0010 and the CARRY IN terminal connected logically as 0. The connections for adjusting the counter 100 to increase by other counts in each step will be apparent therefrom.

Summarizing, the counter 100 shown in FIG. 1 is a start-stop counter wherein a pulse from the CARRY OUT terminal allows the clock pulses to be input to the C input of the four register flip-flops 104, 106, 108, 110. If no pulse appears at the CARRY OUT terminal, the counter 100 stops operation, and a new count must be loaded into the four register flip-flops to once more start operation of the counter.

FREE RUNNING COUNTER

FIG. 2 in addition to describing an adjustable means for varying the counter shift for successive steps (and the up-down characteristics of the counter) also illustrates a free-running counter 134.

In a free-running counter, such as counter 134 of FIG. 2, the count flip-flops 120, 122 of clock pulse unit 118 and the associated gates 116, 124, and 126 shown in FIG. 1 are not required. The oscillator clock pulse output from the oscillator which in this case is designated 103 is fed directly into the C input terminals of the four register flip-flops 104, 106, 108, and 110. The remainder of the connections between the adder 102 and the register flip-flops are same as in FIG. 1.

In the free-running counter 134 of FIG. 2 whenever a clock pulse is generated by oscillator, the four register flip-flops will clock in the count shown on the sum (Σ) terminals of adder 102. Since counter 134 never stops there is no need for a connection as in FIG. 1 from the set subsystem of the processor control unit 103 to the $C_D$ (set) terminals of the four register flip-flops 104, 106, 108, 110; nor is there any need for a connection from the reset subsystem to the $S_D$ terminals of these same flip-flops.

The counter shown in FIG. 2 is a basic counter from which other more complicated counters may be built.

If desired, the fixed connections to the adder B inputs as shown in FIG. 1 may be used with the free-running counter of FIG. 2, and the patch panel 130 shown in FIG. 2 may be used with the B inputs of the adder 102 for the start-stop counter of FIG. 1.

INCREASED COUNTER CAPACITY

The basic counter arrangements of FIGS. 1 and 2 for simplicity purposes were shown as four-bit counters. FIG. 3 illustrates a counter having the basic arrangement of the invention but which has a larger counting capability. As will be shown, a plurality of individual counters similar to the basic unit shown in FIGS. 1, 2 as connected together, will provide a multiple stage counter 138 of any desired capacity.

Multiple stage counter 138 in FIG. 3 is shown as comprising a plurality of stages each of which includes an adder and register flip-flops. For illustrative purposes, Stage 1 is shown as including a four bit adder 102 and four register flip-flops 104, 106, 108, 110. Stage m (the last stage) is shown as including an n bit adder 144, where *n can be selected from a range of numbers, and an n* number of registers indicated generally at 146. Stage 1 may be connected directly to stage *m* or through one or more additional stages as indicated.

Stage *m* as shown in FIG. 3 includes an *n*-bit adder 144 and *n* register flip-flops, wherein the last register flip-flop (n) is disconnected from the adder at points 140, 142. Thus, if in FIG. 3 $n=4$, a three bit counter is provided for stage *m*, by disconnecting the $A_4$ input and $\Sigma_4$ output terminal of the standard four-bit adder. It will be understood that this disconnection is not limited solely to the last register flip-flop associated with a four-bit adder, but can apply to any number of flipof said sum (Σ) adder output terminals to provide the total output of said adder circuit to said flip-flop circuits, control means for connecting control signals to said adder control input terminals and said carry-in input for combining with the count on said adder input terminals as received from said flip-flop circuits, and means for providing clock pulses to said flip-flop circuits to control same to register the total count which appears on said adder output terminals and thereby correspondingly change the count applied to said adder input terminals.

2. A control circuit as set forth in claim 1 which includes adjustable means for providing different marking signals to said control input terminals to thereby vary the count operation of the counter circuit.

3. A counter circuit as set forth in claim 1 in which said control input terminals are the B inputs of an adder circuit and said bit input terminals are the A inputs of an adder circuit.

4. A counter circuit as set forth in claim 1 which includes means for marking said control input terminals to provide a down count with the provision of each clock pulse to said flip-flop circuits.

5. A counter circuit as set forth in claim 1 which includes means for marking said control input terminals to provide a count increase with the provision of each clock pulse to said flip-flop circuits.

6. A counter circuit as set forth in claim 1 in which said count flip-flop includes a set terminal, and an input circuit over which logic 1 and logic 0 signals are applied to said flip-flop circuits to load a count therein.

7. A counter circuit as set forth in claim 1 in which said means for providing clock pulses to said flip-flop circuits includes a start-stop control circuit for stopping said counter after a predetermined number of counts.

8. A counter circuit as set forth in claim 1 in which an adder and its interconnect flip-flops comprise one stage, and in which said counter circuit includes a plurality of said stages, and means connecting the carry out terminal of each stage in the counter to the carry in input terminal of a different stage.

9. In a counter circuit, at least one *n* bit adder circuit having a first plurality of input terminals, a second plurality of input terminals, a carry-in terminal, a plurality of sum (Σ) output terminals and a carry-out terminal, a plurality of flip-flop circuits, each of which flip-flop circuits includes at least one input terminal and at least one output terminal, first means connecting the output terminal of each of said flip-flop circuits to a correspondingly different one of said second plurality of input terminals on said adder circuit to provide the count on said output terminals of said flip-flop circuits to the second plurality of input terminals of said adder circuit, second means connecting the input terminal of each of said flip-flop circuits to a correspondingly different one of said sum (Σ) output terminals to provide the total output of said adder circuit to said flip-flop circuits, control means for connecting control signals to said first plurality of input terminals of said adder circuit for combining with the count on said adder input terminals as received from said flip-flop circuits, and means for providing lock pulses to said flip-flop circuits to control same to register the total count which appears on said adder output terminals and thereby correspondingly change the count applied to said adder input terminals.

10. A counter circuit as set forth in claim 9 in which said control means includes adjustable means for providing different potential markings on said first plurality of input terminals to thereby vary the operation of the counter circuit.

11. A control circuit as set forth in claim 9 which includes means operative to mark said first plurality of input terminals of said adder circuit to provide a predetermined down count with each input to said second plurality of input terminals by said flip-flop circuits.

12. A counter circuit as set forth in claim 9 in which each flip-flop circuit includes a set terminal input, and in which said counter circuit includes means for simultaneously setting the flip-flop circuits to a set condition which represent a desired start count.

13. A system as set forth in claim 12 which includes an output circuit, and in which said means for providing clock pulses to said flip-flop circuits includes delay means connected between said carry out terminal and said output circuit.

14. A system as set forth in claim 9 in which said means for connecting clock pulses to said flip-flop circuits includes gate means, and which includes means for controlling said gate means to terminate said clock pulses to said flip-flops responsive to operation of said flip-flops to a predetermined count.

15. A system as set forth in claim 14 in which said gate means includes a plurality of terminals, and in which said last means includes a connection from said carry out to one of said input terminals on said gate means.

16. A system as set forth in claim 9 in which said means for providing clock pulses to said flip-flops comprise a free running oscillator.

17. A system as set forth in claim 9 which includes means for connecting potentials to said first plurality of input terminals to effect jumping of the count to a value other than indicated by the input from said flip-flop circuits.

18. A system as set forth in claim 9 which includes means for providing potential signals to said first plurality of inputs to effect change of each count input from said flip-flops by a value other than one.

19. A counter circuit as set forth in claim 9 in which one *n* bit adder and said plurality of flip-flops connected thereto comprises one stage of the counter circuit, and which include means connecting the carry out terminal of each stage with the exception of the last stage to the carry in terminal of a different stage in the counter circuit.

20. A counter circuit as set forth in claim 9 in which the number of flip-flop circuits equals *n*, and which $n = 4$.

21. A counter circuit as set forth in claim 9 in which the number of flip-flops which has its input and output terminals connected to its associated adder is less than *n*.

* * * * *

UNITED STATES PATENT OFFICE
CERTIFICATE OF CORRECTION

Patent No. 3,704,361 Dated November 28, 1972

Inventor(s) Albert D. Patterson

It is certified that error appears in the above-identified patent and that said Letters Patent are hereby corrected as shown below:

Column 12, line 57, "for" should be -- four --.

Column 14, line 57, after "and" insert -- in --.

Signed and sealed this 1st day of May 1973.

(SEAL)
Attest:

EDWARD M. FLETCHER, JR.
Attesting Officer

ROBERT GOTTSCHALK
Commissioner of Patents